United States Patent

[11] 3,540,661

[72] Inventors Cornelis van der Lely
Zug, Switzerland;
Ary van der Lely, Maasland, Netherlands
[21] Appl. No. 805,101
[22] Filed Feb. 24, 1969
A continuation of Ser. No. 654,277,
July 18, 1967, abandoned, which
is a continuation of Ser. No. 548,943,
May 10, 1966, abandoned, which is a
continuation-in-part of Ser. No.
318,968, Oct. 25, 1963, now Pat. No.
3,273,898.
[45] Patented Nov. 17, 1970

[54] IMPLEMENT FOR SPREADING POWDERS OR
GRANULAR MATERIAL
6 Claims, 4 Drawing Figs.
[52] U.S. Cl........................................... 239/689,
239/666
[51] Int. Cl......................................... A01c 3/06,
E01c 19/20
[50] Field of Search........................... 239/661
—689

[56] References Cited
UNITED STATES PATENTS
| 769,126 | 8/1904 | Adams et al............... | 239/666 |
| 2,487,552 | 11/1949 | Humphrey.................. | 239/666 |
| 2,587,115 | 2/1952 | Chester...................... | 239/511 |
| 2,945,698 | 7/1960 | Kaller......................... | 239/655 |
| 2,961,273 | 11/1960 | Whistler et al............ | 302/34 |
| 3,164,387 | 1/1965 | Van Der Lely............. | 239/661 |
| 3,273,898 | 9/1966 | Van Der Lely et al..... | 239/666 |
| FOREIGN PATENTS | | | |
| 1,273,146 | 4/1961 | France....................... | 239/661 |

Primary Examiner—Lloyd L. King
Attorney—Mason, Mason & Albright

ABSTRACT: A spreader for connection to a three-point linkage of a tractor including a hopper and a rotatable spreading member positioned beneath the hopper. The spreader is supported by the frame of the spreader above the spreading member. A guide member surrounds the spreader member and has two outlet canals tangentially arranged 180° removed from one another.

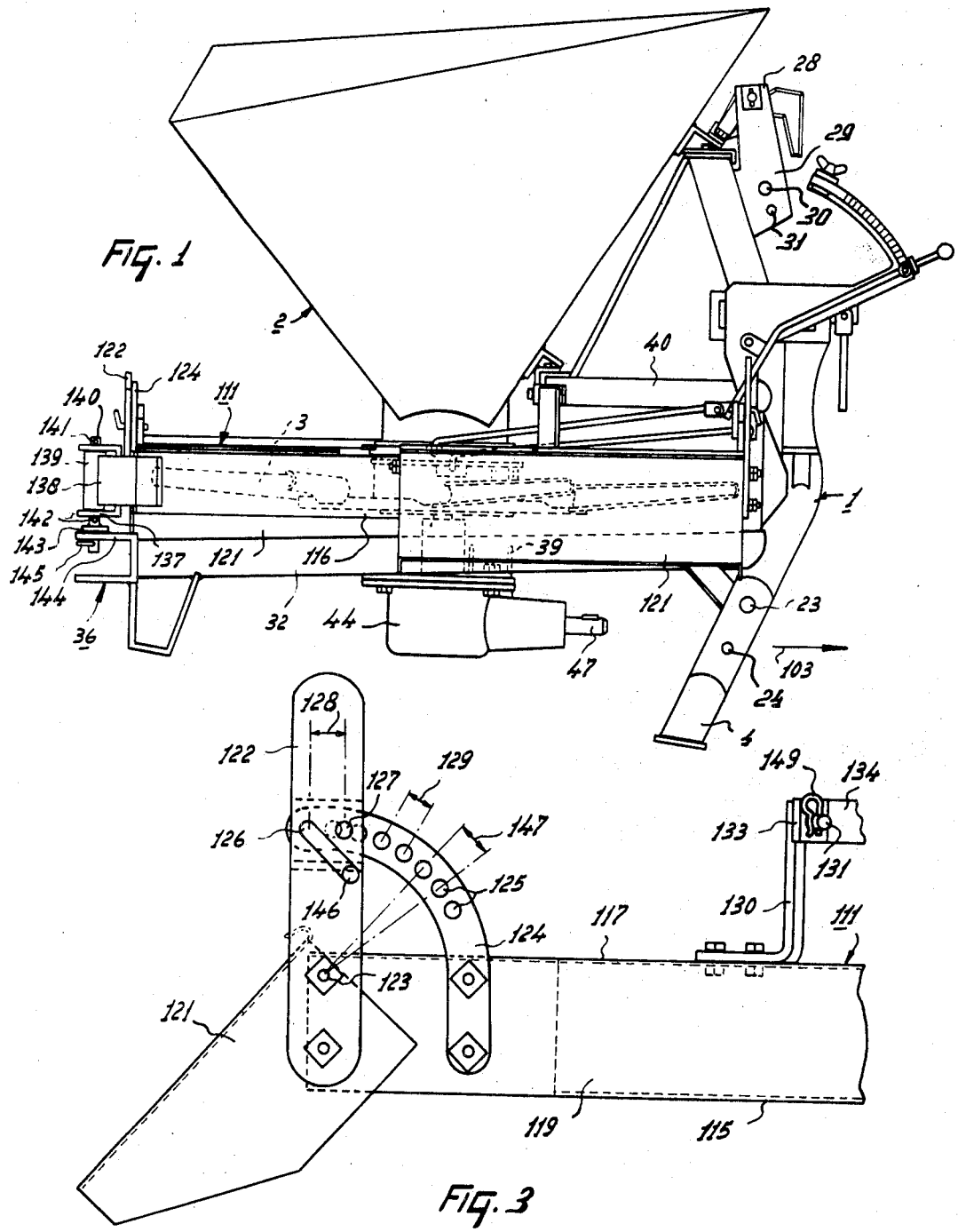

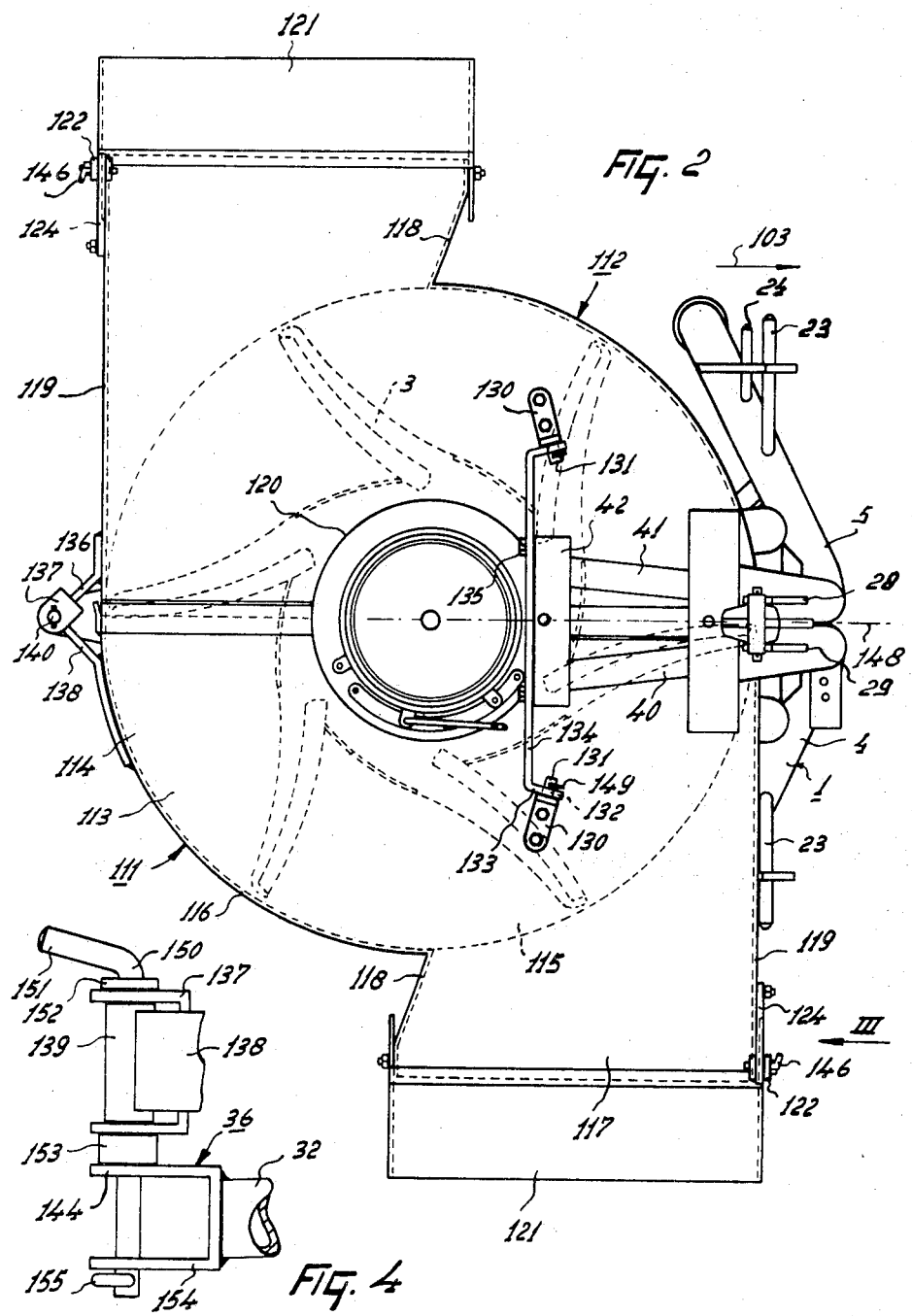

IMPLEMENT FOR SPREADING POWDERS OR GRANULAR MATERIAL

This application is a continuation of U.S. Pat. application Ser. No. 654,277 filed July 18, 1967, now abandoned, which is a continuation of U.S. Pat. application Ser. No. 548,943 filed May 10, 1966, now abandoned, which is a continuation-in-part of U.S. Pat. application Ser. No. 318,968, filed Oct. 25, 1963, now U.S. Pat. No. 3,273,898 and relates to improved implements for spreading powdered or granular materials such as artificial fertilizers or seeds. More particularly this invention relates to means for guiding materials being spread using a guide member having canals which extend tangentially from a rotary spreading member.

In the present invention, spreading implements comprising a hopper supported on a frame and rotary spreading member positioned beneath the opening in the hopper, are provided with a guide member to effectively channel and direct material thrown by the spreading member. The material is chiefly directed in directions transverse to the normal direction of travel.

The accompanying drawings show specific embodiments and:

FIG. 1 is a side elevation showing a spreader with the guide in operative position;

FIG. 2 is a plan view of the guide of FIG. 1 with certain parts removed;

FIG. 3 is a fragmentary view in side elevation in the direction of the arrow III of FIG. 2;

FIG. 4 is an enlarged view of an alternative embodiment of the connection between the guide and the frame of the hopper.

In FIG. 1 the implement 1 has a hopper 2 with a rotary spreading member 3 positioned beneath the hopper. The implement and parts thereof are the same as those shown and described in FIG. 8 of copending U.S. Pat. application Ser. No. 318,968 now U.S. Pat. No. 3,273,898, which application is incorporated by reference herein. Frame beams 4 and 5 have projecting pins 23 and 24 and a pair of check plates, 28 and 29, are mounted on the frame. A three point lifting device can be conveniently connected to the implement with the lower links engaging pins 23 or 24 and the upper lifting link coupled to the check plates 28 and 29 through holes 30 or 31 in each check plate.

A pair of lower frame beams support forked bracket 36 and gear casing 44 housing input shaft 47. Only beam 32 is seen in side elevation, the other beam being joined to beam 32 with a channel beam 39. Also, two horizontally disposed beams 40 and 41 diverge rearwardly relative to direction arrow 103 and the rearmost ends of beams 40 and 41 are interconnected by a transverse beam 42.

A guide with casing 111 is comprised by two substantially identical parts 112 and 113 that are disposed on relatively opposite sides of a plane 148. The part 113 includes a plate 114 disposed above the ejector 3 and a plate 115 disposed beneath the ejector 3, the edges of these two plates being interconnected by a curved rim 116 whose center of curvature coincides with the axis of rotation of the ejector 3. The upper plate 114 has an extension 117 provided with opposite side walls 118 and 119 which project approximately vertically downwardly therefrom. The parts 117, 118 and 119 together form a delivery nozzle that extends substantially perpendicular to the intended direction of travel 103. The plates 114 and 115 both have radially inner edges 120 that are spaced from the axis of rotation of the ejector 3 by the same distance. The radially outermost edge of the plate 115 is joined to the lowermost edge of the curved rim 116.

The delivery nozzles form elongated canals in which the leading sides 119 are substantially tangential to the spreading member. The leading sides 119 are substantially straight and perpendicular to the normal direction of travel. By surrounding most of the spreader with a guide and forming elongated canals with sides 118 and 119, material can be directed accurately in relatively narrow streams without excessive scattering.

A distribution flap 121 is provided at the outlet of the delivery nozzle and is pivotally connected to the sidewalls 118 and 119 of the latter. A bracket 122 (FIG. 3) is fastened to one end of the flap 121 and an arcuately curved strip 124 is fastened to the adjoining sidewall 119 of the guide. The center of curvature of the strip 124 coincides with an approximately horizontal pivotal axis afforded by pivots 123 interconnecting the flap 121 and the sidewalls 118 and 119. The curved strip 124 is formed with a row of holes 125 while bracket 122 is formed with two holes 126 and 127 that are spaced apart from the said pivotal axis by the same distance as are all the holes 125. The perpendicular distance 128 between the center of the two holes 126 and 127 is one and a half times the perpendicular distance 129 between the center of two neighboring holes 125.

The upper plate 114 of the casing 111 carries a connecting member in the form of a strip 130 having a vertically disposed portion upon which a horizontally projecting dowel 131 is rigidly mounted. The dowel 131 is entered through a matching hole 132 formed in the bent-over end 133 of a transverse bracket 134 that is fastened to the beam 42 with the aid of bolts 135. A small transverse hole is formed through the dowel 131 towards the tip thereof and a resilient retaining clip 149 has one of its limbs entered through the said hole to prevent disengagement of the dowel 131 from the hole 132 in the bent-over end 133. As can be seen in FIG. 2. of the drawings, the opposite end of the transverse bracket 34 cooperates with a connecting member in the form of a further strip 130 carried by the upper plate 114 of the part 112.

One end of a strip 136 is fastened to the side of the part 112 of the casing 111, the opposite end of the said strip carrying a forked bracket 137. A further bent strip 138 has one end secured to the side of the part 113 of the casing 111 and the opposite end of this strip carries a vertically disposed sleeve 139 that is entered between the vertically spaced limbs of the forked bracket 137. The said limbs are formed with vertically aligned holes that register with the sleeve 139 and also with the holes formed in the limbs of the underlying bracket 36. An approximately vertical pivot pin 140 is entered through the holes in the limbs of the bracket 137, the sleeve 139 and the hole in the uppermost limb 144 of the forked bracket 36, this limb not being widened to form a step as in the case of the previously described limb 37. Small transverse pins 141 and 142 are entered through bores formed in the pivot pin 140 immediately above and below the limbs of the bracket 137 so that the pivot pin 140 cannot move axially relative to the bracket. A ring 143 is secured to the pivot pin 140 immediately above the limb 144 while a resilient retaining clip 145 is entered through a transverse hole formed in the pivot pin immediately below the limb 144. The pivot pin 140 cannot therefore move axially to any substantial extent relative to the limb 144.

During the use of the implement, material from the hopper 2 reaches the spreading member or ejector 3 and is subsequently thrown radially outwardly towards the delivery nozzles afforded by the parts 117 to 119. The material is thus spread on two separate areas of land lying on relatively opposite sides of the implement. The distribution flaps 121 have inclined surfaces that direct any material which strikes them downwardly towards the ground. The flaps 121 can be angularly adjusted about their pivots 123 and it will be evident that this adjustment can be employed to influence the distances that the two areas upon which the material falls are spaced from the opposite sides of the implement. As can be seen in FIG. 3 of the drawings, a horizontal locking pin 146 is provided for entry through either the hole 126 or the hole 127 and a chosen one of the row of holes 125. The holes chosen determine the angular setting of the corresponding flap 121 about its pivots 123. Neighboring holes 125 are spaced apart from one another by the aforementioned distance 129, this distance subtending an angle 147 at the axis afforded by the pivots 123. When it is desired to turn the flap 121 about the pivots 123 through an angle having only half the magnitude of the angle 147, this can be achieved by withdrawing the locking pin 146 from the two holes in which it is entered, turning the said flap 121 and strip 122 about the pivots 123 through the angle concerned and reentering the locking pin 146 through the other one of the two holes 126 and 127 and a fresh hole 125 which will then be in register The two parts 112 and 113 of the casing 111 engage one another along lines that are contained in the aforementioned plane 148, this plane also containing the longitudinal axis of the pivot pin 140. Access may be had to the ejector 3 by turning the two parts 112 and 113 relative to one another about the pivot pin 140, such turning movements being normally prevented by the provision of the resilient retaining clips 149. The whole of the casing 111 can be removed readily from the implement after turning the two parts thereof relative to one another about the pivot pin 140 merely by withdrawing the resilient retaining clip 145 and lifting the whole casing, together with the pivot pin 140, clear of the limb 144 of the bracket 36.

FIG. 4 of the drawings shows an alternative embodiment of the pivotal connection between the two parts 112 and 113 of the casing 111, the pivot pin 140 being replaced by a combined vertical pivot pin and locking pin 150 having a handle 151 at its uppermost end. A ring 152 is secured to the pin 150 immediately beneath the handle 151 while a spacing ring 153 is arranged loosely around the pin 150 between the lowermost limb of the bracket 137 and the uppermost limb 144 of the bracket 36. The pin 150 is longer than the pin 140, its lowermost end being entered through a hole in the lowermost limb 154 of the bracket 36. A transverse bore is formed through the pin 150 adjacent the tip thereof and a resilient retaining clip 155 is entered through the said bore to prevent the pin 150 from being moved axially upwards. When it is desired to hitch a wagon or the like to the implement for the purpose previously described, the resilient retaining clip 155 is withdrawn and the pin 150 listed to such an extent that its tip is raised clear of the limbs of the bracket 36. Upon entering the apertured drawbar of the wagon or the like between the limbs 144 and 154, the pin 150 is pushed back into the position shown in FIG. 11 and the resilient retaining clip 155 replaced. When required, the pin 150 can be completely removed from the brackets 137 and 36 so that the two parts 112 and 113 of the casing 111 can be separated from one another.

We claim:

1. A fertilizer spreader for spreading powdered or granular materials comprising a frame-coupling means to connect said frame to the three-point linkage of a tractor; a hopper for the material to be spread and a rotatable spreading member, said hopper being supported by said frame above said spreading member, a gearbox arranged beneath said spreading member; a driving shaft associated with said gearbox; means to couple said driving shaft with the power takeoff of a tractor; said frame comprising an upright extending frame part, said coupling means being associated with said upright extending frame part; a horizontal frame part, at least the greater part of the spreading member being surrounded by a guide member for the material, said guide member being supported by said horizontal frame part and consisting of two outlet canals substantially symmetrically positioned on said spreading member through which the material distributed by the spreading member is delivered into two streams extending transverse to the intended direction of travel of the spreader, said canals being substantially tangentially arranged with respect to said spreading member and being substantially 180° removed from one another around the axis of rotation of said spreading member and extending transverse to the intended direction of travel of the spreader; and one leading canal, said leading canal being arranged adjacent said upright extending frame part, each canal being provided with a pivotally mounted distribution flap which is adjustable to any one angular setting and the pivotal axis of said distribution flap extending substantially in the direction of travel of said spreader said guide member carrying a strip formed with a row of holes that are equally spaced from the pivotal axis and said flap having a bracket formed with two holes that are spaced apart from one another by a distance which differs from the spaces between the neighboring holes of the row formed in said strip, whereby a locking pin can be entered through selected registering holes of said strip and bracket to retain the distribution flap in a corresponding angular setting about said pivotal axis.

2. A fertilizer spreader for spreading powdered or granular materials comprising a frame-coupling means to connect said frame to the three-point linkage of a tractor, a hopper for the material to be spread and a rotatable spreading member, said hopper being supported by said frame above said spreading member; a gearbox arranged beneath said spreading member; a driving shaft associated with said gear box; and means to couple said driving shaft with the power takeoff of a tractor, said frame comprising two upright extending frame beams arranged at the front side of the spreader with regard to the intended direction of travel of the spreader, the upper ends of said frame beams connected to the hopper and a substantially horizontal rearwardly extending supporting beam means connected to said frame beams below said upper ends, said beam means supporting said hopper, said coupling means being associated with said upright extending frame beams, at least the greater part of said spreading member being surrounded by a guide member for the material, said guide member being supported by said spreader and having two separate substantially identical parts which are detachably connected with one another, each of said parts comprising an outlet canal, said parts being positioned around said spreading member through which the material distributed by the spreading member is delivered into two streams extending transversely to the intended direction of travel of the spreader, said canals being substantially tangentially arranged with respect to said spreading member and being substantially 180° removed from one another around the axis of rotation of said spreading member and extending transversely to the intended direction of travel of the spreader.

3. A fertilizer spreader as claimed in claim 2 wherein each of said canals is provided with a pivotally mounted distribution flap which is adjustable to any one angular setting and the pivotal axis of said distribution flap extends substantially in the direction of travel of said spreader.

4. A fertilizer spreader as claimed in claim 2 wherein said guide member with said canals is divided into two identical parts connected to one another by a pivot.

5. A fertilizer spreader for spreading powdered or granular materials comprising: a frame-coupling means to connect said frame to the three-point linkage of a tractor; a hopper for the material to be spread and a rotatable spreading member, said hopper being supported by said frame above said spreading member; a gearbox arranged beneath said spreading member; a driving shaft drivenly connecting said spreading member with said gearbox; means to couple said driving shaft with the power take off of a tractor, to drive said spreading member, said frame comprising two upright extending frame beams arranged at the front side of the spreader with respect to the normal direction of travel of said spreader; and two substantially horizontal extending supporting beams connected to said upright frame beams below the upper ends of said beams, said supporting beams extending rearwardly from said frame beams, with respect to said direction of travel and the ends of said supporting beams being interconnected by a transverse beam, said supporting beams and transverse beam retaining said hopper, said coupling means being associated with said upright extending frame beams, at least the greater part of said spreading member being surrounded by a guide member for the material, said guide member being supported by said spreader and being comprised of two separate substantially similar parts which are detachably associated with one another, each of said parts comprising an outlet canal, said parts being positioned around said spreading member through which the material distributed by the spreading member is delivered into two streams extending perpendicular to the normal direction of travel of the spreader, one of said canals being tangentially arranged in the rear part of said guide member, said channels being parallel to one another and extending in opposite directions perpendicular to the normal direction of travel of said spreader.

6. A fertilizer spreader as claimed in claim 5, wherein said substantially similar parts are pivotably connected to one another and said canals are 180° removed from one another.